United States Patent
Marchitto et al.

(10) Patent No.: US 6,673,214 B1
(45) Date of Patent: Jan. 6, 2004

(54) ENERGY ENHANCED REACTION CATALYSIS AND USES THEREOF

(75) Inventors: Kevin S. Marchitto, Mt. Eliza (AU); Stephen T. Flock, Mt. Eliza (AU)

(73) Assignee: Rocky Mountain Biosystems, Inc., Golden, CO (US)

( * ) Notice: Subject to any disclaimer, the term of this patent is extended or adjusted under 35 U.S.C. 154(b) by 0 days.

(21) Appl. No.: 09/546,065

(22) Filed: Apr. 10, 2000

Related U.S. Application Data

(60) Provisional application No. 60/128,444, filed on Apr. 9, 1999.

(51) Int. Cl.[7] ................................................. C25D 7/12
(52) U.S. Cl. .................................................. 204/157.15
(58) Field of Search ..................................... 204/157.15

(56) References Cited

U.S. PATENT DOCUMENTS

| | | | |
|---|---|---|---|
| 4,891,593 A | * 1/1990 | Lurie et al. ................. | 324/307 |
| 5,350,686 A | * 9/1994 | Jhingan ..................... | 435/173.2 |
| 5,403,747 A | * 4/1995 | Akins, Jr. et al. ............. | 436/86 |
| 5,627,054 A | * 5/1997 | Gillespie ................... | 435/91.2 |
| 5,689,008 A | * 11/1997 | Satyapal et al. ............ | 568/403 |
| 6,136,157 A | * 10/2000 | Lindeberg et al. ....... | 204/157.6 |

FOREIGN PATENT DOCUMENTS

WO     WO 98/06876 A1   * 2/1998

\* cited by examiner

*Primary Examiner*—Edna Wong
(74) *Attorney, Agent, or Firm*—Benjamin Aaron Adler

(57) ABSTRACT

The present invention provides a method/device for enhancing a chemical reaction including PCR and ELISA by utilizing electromagnetic or mechanical energy. Such method/device can also be used for increasing the rate at which a group of molecules reaches a different molecular configuration from initial configuration, thereby increasing binding and reacting of the molecules.

2 Claims, 5 Drawing Sheets

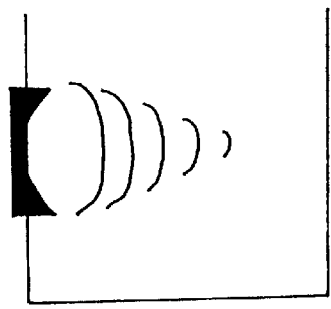
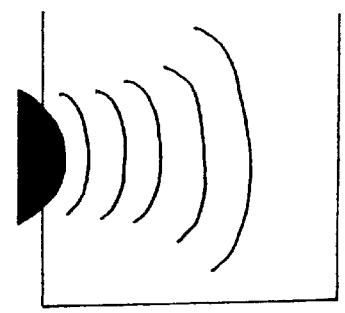
Fig. 4B
Fig. 4C
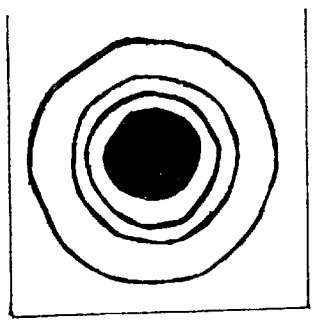
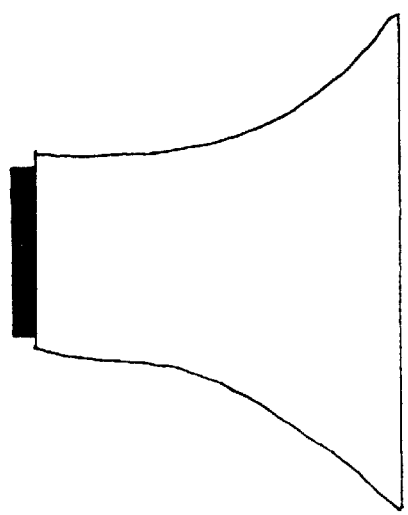
Fig. 4D
Fig. 4E

ENERGY ENHANCED REACTION CATALYSIS AND USES THEREOF

CROSS-REFERENCE TO RELATED APPLICATION

This non-provisional patent application claims benefit of provisional patent application U.S. Ser. No. 60/128,444, filed Apr. 9, 1999, now abandoned.

BACKGROUND OF THE INVENTION

1. Field of the Invention

The present invention relates generally to the fields of biochemical reaction and biomedical physics. More specifically, the present invention relates to methods/devices used for enhancing catalytic chemical reaction by adding energy to the reactants therefore to increase the frequency at which reactants reach transition states of reaction.

2. Description of the Related Art

Activation Energy and Reaction Rates: In any given chemical reaction, the equilibrium of the reaction is given by the difference in $\Delta G^0$ for the reaction. The equilibrium concentrations of substrate (A) and product (C) are determined by their difference in free-energy content, $$\Delta G^0 = -RT \ln k_{eq}$$

Wherein R=gas constant, 8.3 JK$^-$mol$^{-1}$, T=absolute temperature and $K_{eq}$=equilibrium constant for the reaction (see FIG. 1).

Heat, when added to a reaction, will alter the free energy content of the reaction and therefore will shift the equilibrium of the reaction. It has also been shown that electromagnetic energy, by translating absorbed energy into translational motion, can enhance chemical reactions. However, there is an activation energy barrier between the substrate and product which is given by $\Delta G'$. This $\Delta G'$ represents the change in free energy that must be put into the system to reach the transition state (FIG. 1). Similarly, the reaction rate is affected by energy of activation, $E_a$, that reflects the amount of energy that must be added to a reaction for the reactants to reach the transition state. The Arrhenius rate equation describes this reaction rate and is given by:

$$k = A \exp(-E_a/RT)$$

Wherein A=pre-exponential factor and $E_a$=activation energy. Given then, that $\ln(k) = \ln(A) - E_a/RT$, a plot of $\ln(k)$ vs 1/T, gives intercept A and slope $-E_a/R$.

If $E_a$ is high, only a portion of the molecular encounters are energetic enough to result in reaction, but if it is low, a high proportion can react, and the rate coefficient is large. Thus, if the activation energy can be lowered in some way, the reaction proceeds more rapidly.

Anything that stabilizes the transition state relative to reactants will decrease the free energy of activation and therefore increase the reaction rate (FIG. 2). A catalyst lowers the activation energy of the rate determining steps, thereby speeding up the reaction. The role of the catalyst is to permit the formation of a transition state of lower energy (higher stability relative to reactants) than that for non-catalyzed reactions. The catalyst itself does not participate in the reaction stoichiometry (not consumed) and cannot affect the equilibrium position of the reaction. Pauling expressed that stabilization of the transition state of a reaction by an enzyme suggests that the enzyme has a higher affinity for the transition state than it does for the substrate or products. $\Delta G'$ therefore, is reduced during catalysis.

Improved PCR: The polymerase chain reaction is a technique used for in vitro and in situ amplification of specific DNA sequences. The process goes in receptive cycles: denaturing, wherein the DNA of interest is denatured for about 4 minutes at 94° C.; annealing, wherein the appropriate part of the DNA strands are annealed to the primers (i.e., the antisense DNA fragment of interest) at 50° C. for about 2 minutes; and extension, wherein a heat stable enzyme called Taq-DNA-polymerase (Taq) polymerizes the individual DNA bases (deoxyribonucleotides) for 3 minutes, at 72° C. Such cycle is repeated for N times (~20–30 times) with more primers and nucleotides added. For the following cycles, heating parameters may be modified slightly (for example, denaturing for 1 min. at 94° C.; annealing for 2 min. at 50° C.; and extending for 3.5 min at 72° C.). Additionally, the heating parameters for the last cycle are also typically different, for example, denaturing for 1 min. at 94° C.; annealing for 2 min. at 50° C.; and extending for 10 min at 72° C. As a result, the DNA of interest is amplified by $2^N$.

For the heating protocol example above, the total time for denaturation is 4+(20×1)+1=25 minutes with additional time needed for cooling (if N=20). If it were possible to denature and cool the DNA more efficiently, a significant timesaving would result. Furthermore, the part of the PCR cycle that involves the highest temperatures would be eliminated, and thermal breakdown of the reaction buffer materials would be reduced. Further, increasing the reaction rate of the annealing and extension phases of PCR would also add a time-saving.

Biochemical Reaction Catalysis: In order to undergo a chemical reaction, a reactant or reactants must first gain energy (activation energy) to form an activated complex before they can proceed forward to a state (products) of different energy or enthalpy. Generally, enzymes are used to help the reaction take place (i.e. catalyze the reaction). Heat can also be used to speed up the reaction rate. Additionally, vibrational excitation can be used to promote endoergic (energy consuming) reactions [1].

The prior art is deficient in the lack of effective means of enhancing reaction catalysis by adding energy to the reactants. The present invention fulfills this long-standing need and desire in the art.

SUMMARY OF THE INVENTION

The present invention provides methods of enhancing reaction catalysis by adding energy to reactants. Specifically, the present invention provides a method of using electromagnetic energy or propagating pressure waves to enhance reaction, wherein vibrations, rotations, and/or particular configurations or orientations of the reactants are induced. When done properly, these methods do not cause irreversible damage to the reactants and are especially suitable for use in biochemical reactions both in vitro and in vivo.

In one embodiment of the present invention, there is provided a method of accelerating a chemical reaction by applying electromagnetic or mechanical energy to the reaction mixture. Preferably, the electromagnetic energy is generated by a source which provides radiant energy with wavelength from about 200 nm to about 20,000 nm. Representative examples of electromagnetic energy include radiofrequency wave and microwave, and representative example of mechanical energy is a pressure wave. Still preferably, the chemical reaction is a catalyzed reaction, it can be either a liquid-phase reaction or a solid-phase reaction.

In another embodiment of the present invention, there is provided a device for accelerating a chemical reaction, comprising a reaction chamber; and a means for applying energy to the reaction chamber.

In still another embodiment of the present invention, there is provided a method of enhancing a polymerase chain reaction by applying energy to the reaction. Such method can also be used for enhancing an enzyme linked immunoassay reaction.

In yet another embodiment of the present invention, there is provided a device for enhancing a polymerase chain reaction, comprising a reaction chamber; and a means for applying energy to the reaction chamber. Such device can also be used for enhancing an enzyme linked immunoassay reaction.

In still yet another embodiment of the present invention, there is provided a method of increasing the rate at which a group of molecules reaches a different molecular configuration from initial configuration, comprising the step of applying energy to the molecules. Preferably, the energy is electromagnetic energy or mechanical energy. Representative examples of electromagnetic energy include radiofrequency wave and microwave, and representative example of mechanical energy is a pressure wave. Still preferably, the different molecular configuration is a transition state in a chemical reaction, preferably, a catalyzed chemical reaction.

In yet another embodiment of the present invention, there is provided a device for increasing the rate at which a group of molecules reaches a different molecular configuration from initial configuration, comprising a chamber for holding the molecules; and a means for applying energy to the chamber.

Other and further aspects, features, and advantages of the present invention will be apparent from the following description of the presently preferred embodiments of the invention given for the purpose of disclosure.

BRIEF DESCRIPTION OF THE DRAWINGS

So that the matter in which the above-recited features, advantages and objects of the invention, as well as others which will become clear, are attained and can be understood in detail, more particular descriptions of the invention briefly summarized above may be had by reference to certain embodiments thereof which are illustrated in the appended drawings. These drawings form a part of the specification. It is to be noted, however, that the appended drawings illustrate preferred embodiments of the invention and therefore are not to be considered limiting in their scope.

FIGS. 4B–4E show that different shaped radiant energy absorbing targets within the walls of the reaction chamber 5, or inside the reaction solution, produce different pressure waves.

DETAILED DESCRIPTION OF THE INVENTION

The present invention describes a device composed of a reaction vessel where radiant energy may be supplied in such a way that reactants within the vessel are exposed to a free energy increase in the system which causes increased vibration or rotation in molecular groupings, or causes electrons to shift to excited states making the molecules more reactive. A catalyst present in or attached to the reaction vessel in such a way that the reactants are in contact with the catalyst, will then be in position to stabilize transition states of the reactants, thereby improving the chances that the reaction will proceed forward.

Figure 5:
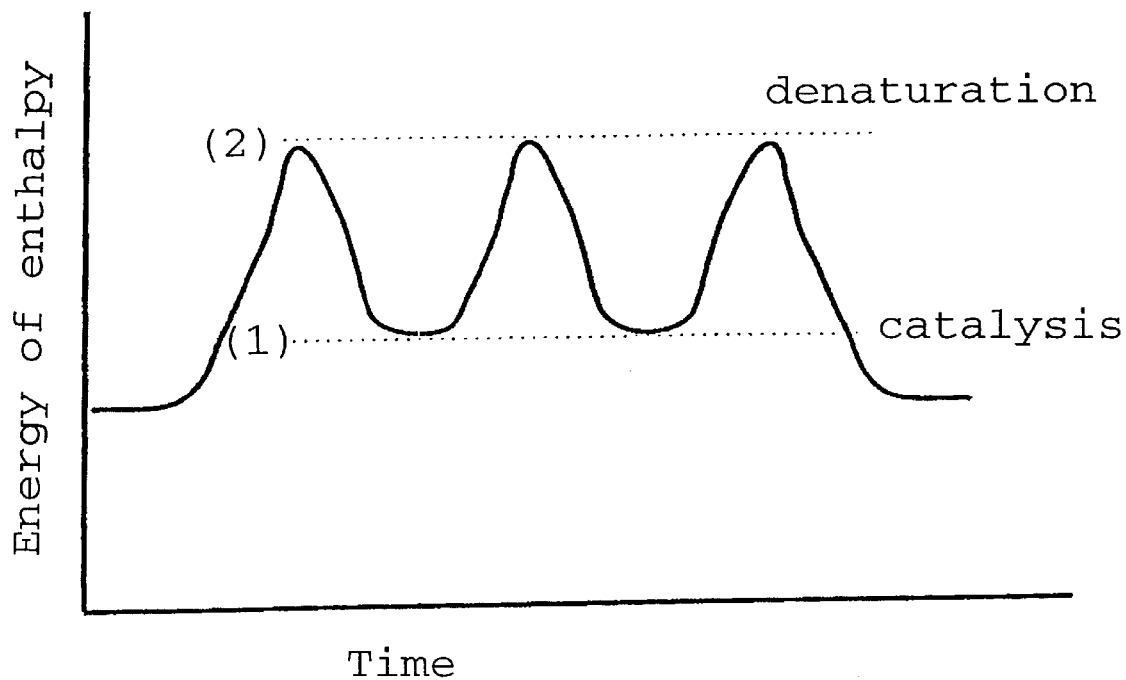
FIG. 5 is an energy diagram demonstrating alternating cycles of radiant energy for multi-step reactions such as the optically enhanced PCR. Energy reaching level (2) is sufficient to separate the strands of DNA. The energy is then reduced to a lower level (1) that favors a second reaction in the sequence by catalysis. Level (1) is not great enough to denature the molecular products. This cycle is repeated to produce long strands of DNA.

The reaction vessel may contain at least one reactant and one enzyme that reacts in a step-wise manner to generate products. Radiant energy of a certain wavelength and energy is delivered to the reaction vessel in such a way that the reactants are activated so the first step catalytic reaction proceeds at a faster pace. A second wavelength, and/or energy is then applied to the reaction such that a second step, which requires a different energy of activation, can then take place. These steps may be repeated for cyclic reactions. For example, in the reaction catalyzed by the enzyme DNA polymerase, a sample of chromosomal or other DNA is present in the reaction chamber with an oligonucleotide primer and the catalyst. In the first step, laser radiation is added to the chamber to increase the energy of the reaction such that the strands of the DNA are denatured and separated either locally or for the greater length of the molecule. When the laser energy is removed, either completely or in between pulses, the strands of DNA will then re-anneal. In the presence of the oligonucleotide primer which matches part of the sequence of a strand of DNA, the primer will compete for binding sites to the strand of denatured DNA. If the primer is in excess relative to the concentration of the sister DNA strand, more primer will bind as opposed to strands re-annealing. In the presence of DNA polymerase, additional nucleotides will be added to the end of the primer such that a new DNA strand is produced. Imparting radiant energy to the reaction chamber will increase the level of activation of the reactants in this case, and the reaction will proceed at a faster rate. Thus, there are two opportunities to use radiant energy in this reaction. A certain wavelength and sufficient energy is used to first denature the DNA. When the energy is removed or reduced, competitive binding of the oligonucleotide may take place. In the catalytic step, the same or different wavelength radiation will be used, but this time a lower energy that will not denature the double stranded DNA, will then accelerate the rate of the DNA polymerase reaction. By cycling the two wavelengths and/or energies, the reaction may be repeated multiple times (see FIG. 5).

In the present invention, radiant energy is provided to an enzyme catalyzed reaction mixture such that energy, in the form of heat, is delivered locally in the immediate environment of the molecule, thereby resulting in thermal acceleration of the rate of reaction. This local heating effect is only transient, on the order of less than microseconds, in the case of a pulsed laser. However, it is of sufficient length to result in an increase in the frequency at which these molecules reach their transition state. In the presence of a catalyst, this transition state is stabilized and the reaction proceeds. Specifically, the use of short, high-energy pulses of radiant energy results in little heating of the surrounding medium.

In one embodiment of the present invention, there is provided a method of accelerating a chemical reaction by applying electromagnetic or mechanical energy to the reaction mixture. Preferably, the electromagnetic energy is generated by a source which provides radiant energy with wavelength from about 200 nm to about 20,000 nm. Representative examples of electromagnetic energy include radiofrequency wave and microwave, and representative example of mechanical energy is a pressure wave. Still preferably, the chemical reaction is a catalyzed reaction, it can be either a liquid-phase reaction or a solid-phase reaction.

In another embodiment of the present invention, there is provided a device for accelerating a chemical reaction, comprising a reaction chamber; and a means for applying energy to the reaction chamber.

In still another embodiment of the present invention, there is provided a method of enhancing a polymerase chain reaction by applying energy to the reaction. Such method can also be used for enhancing an enzyme linked immunoassay reaction.

In yet another embodiment of the present invention, there is provided a device for enhancing a polymerase chain reaction, comprising a reaction chamber; and a means for applying energy to the reaction chamber. Such device can also be used for enhancing an enzyme linked immunoassay reaction.

In still yet another embodiment of the present invention, there is provided a method of increasing the rate at which a group of molecules reaches a different molecular configuration from initial configuration, comprising the step of applying energy to the molecules. Preferably, the energy is electromagnetic energy or mechanical energy. Representative examples of electromagnetic energy include radiofrequency wave and microwave, and representative example of mechanical energy is a pressure wave. Still preferably, the different molecular configuration is a transition state in a chemical reaction, preferably, a catalyzed chemical reaction.

In yet another embodiment of the present invention, there is provided a device for increasing the rate at which a group of molecules reaches a different molecular configuration from initial configuration, comprising a chamber for holding the molecules; and a means for applying energy to the chamber.

The following examples are given for the purpose of illustrating various embodiments of the invention and are not meant to limit the present invention in any fashion.

EXAMPLE 1

Biochemical Reaction Catalysis

Since the energy imparted to a system by photonic energy increases the free energy of the system, it follows that the frequency at which molecules reach a transition state will be increased. In the presence of a catalyst, this transition state is stabilized relative to reactants and the forward rate of reaction is favored. However, energy must be added to the reaction system with care so that the reactants wouldn't be simply denatured or destroyed to produce useless species. Thus, controlling the level of energy imparted into a system is important. Radiant energy from lasers, and other forms of energy described within, such as microwaves and radiofrequency waves, may be easily controlled to deliver an appropriate measure of energy.

Figure 3:
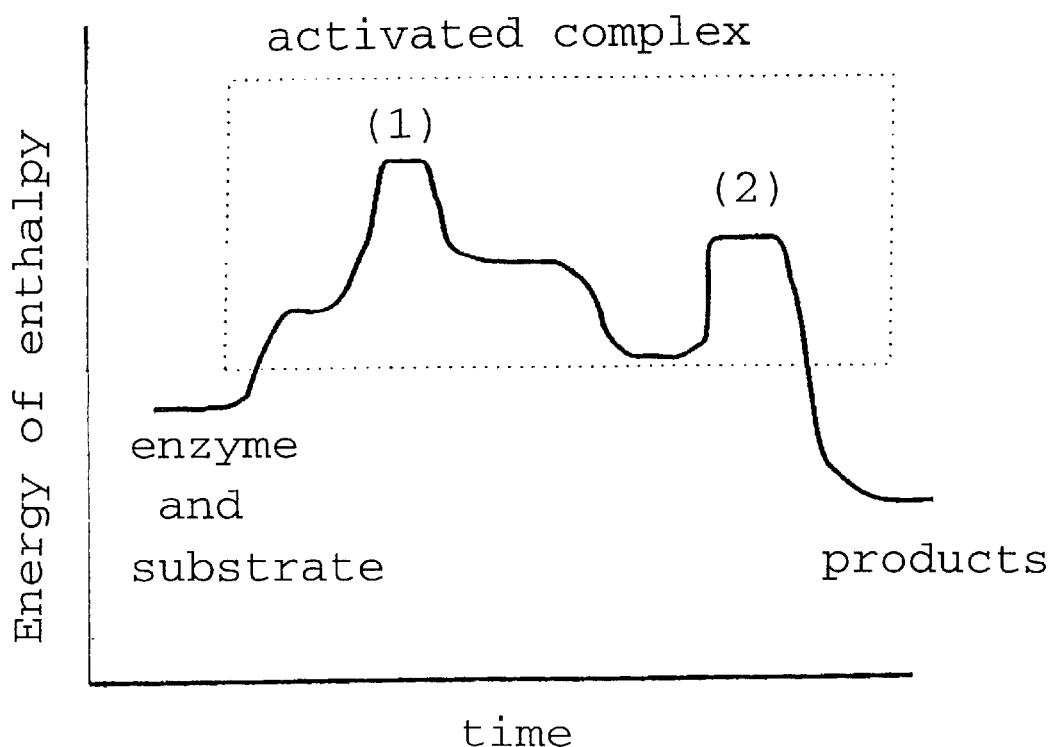
FIG. 3 shows reaction coordinates as a function of the free energy in the presence of an enzyme. The free energy of activation, $\Delta G'$, is broken into smaller increments by the stepwise action of the enzyme catalyst which first forms an enzyme-substrate complex (i.e., ES), reaches the intermediate transition state (1), and the intermediate transition state (2), and finally proceeds to the subsequent product.
Figure 4A:
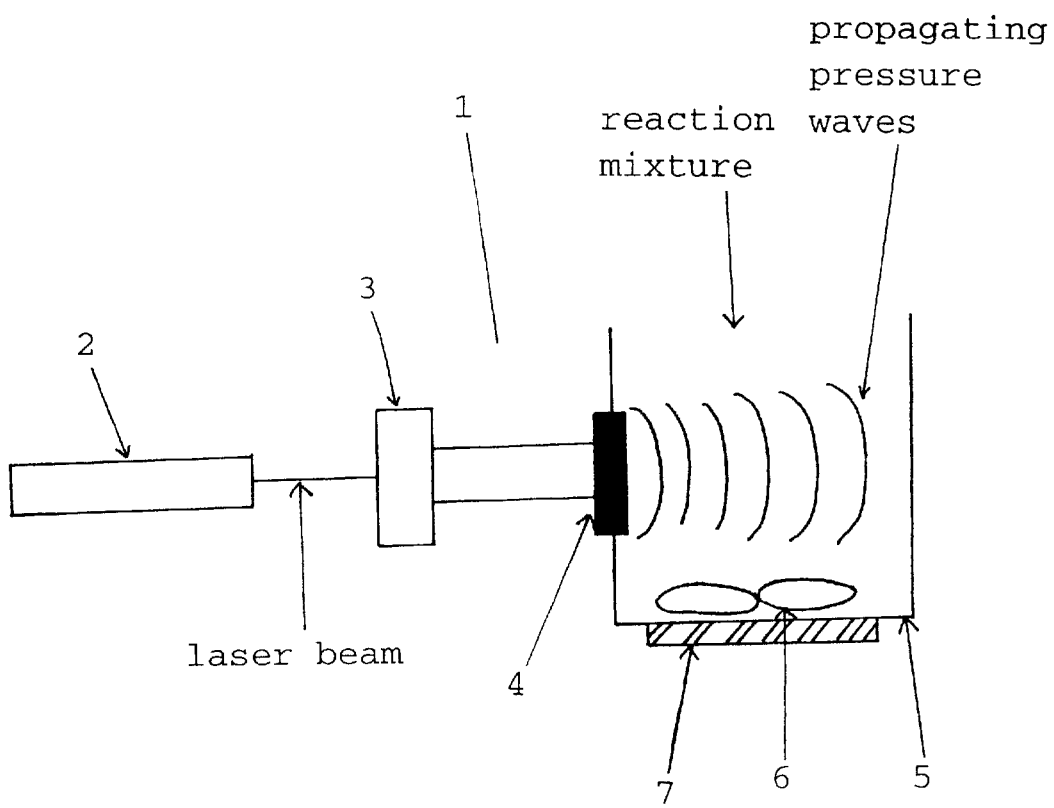
FIG. 4A shows a kind of device used for enhancing a PCR reaction. Such device comprises a radiant energy source for heating the reaction; a microvessel containing the reactants; and a cooling chamber. Optionally, a catalyst can be included. The vessel alternates between heating and cooling cycles allowing standard PCR reaction to proceed. Alternatively, an optional reaction chamber, without the energy absorbing target/transducer, may be used to directly delivery energy to the reactants for either local heating or for increasing the energy state of the reactants thereby increasing the frequency at which the reactants reach transition state. Specifically, the device 1 shown in FIG. 4A comprises pulsed laser source 2 to generate a laser beam, expanding/focusing optics 3, radiant energy absorbing target/transducer 4 to transduce propagating pressure waves, a reaction chamber 5 containing reaction mixture and stir bars 6, and heater/cooler 7.

Enzymatic catalysts are believed to lower $\Delta G'$ by replacing a single step of large $\Delta G'$ with several smaller steps of lower $\Delta G'$ (FIG. 3). Thus, enzyme mediated catalysis is extremely efficient for reactions with large $\Delta G'$ because each incremental step is composed of a smaller transition energy of activation. Thus, if one can impart small increments of energy to a reaction mixture, in the form of radiant energy for example, then the stepwise transitions may be taken advantage of and the undesirable reactions and denaturation avoided.

One viewpoint is that the effect of the photons absorbed results in a local or regional heating around or within the molecule. This only needs to be transient since the transition state for the reaction is only maintained on the order of $10^{-13}$ seconds. This rapid heating increases the frequency at which molecules reach the transition state thereby giving the catalyst more opportunity to stabilize the state. Short and high-energy pulses of radiant energy can be used resulting in little heating of the surrounding medium.

Alternatively, a continuous wave or pulsed laser is used to heat the surrounding medium rapidly in such a way that the heat involved in the reaction increases rapidly. A small reaction volume can then be cooled rapidly so that unstable products or side reactions are minimized. This approach is particularly useful when cyclic reactions are necessary, wherein rapid heating and cooling steps may take place in relatively small volumes. Energy may also be added to the system using microwaves or radiofrequency waves in the same manner. Radiofrequency waves are of particular interest because they are capable of causing the vibrational effects in the medium without heating of the applicator. In effect, radiofrequency waves may be incorporated into a heating element that does not heat up the element itself during use. In this case, the heating element could always be kept cold while it transmits energy to the reaction medium in direct contact with or near to it.

Still alternatively, short and repeated pulses of radiant energy are directed at the molecular species which causes an increased level of excitation. This approach takes advantage of the fact that molecular species absorb photonic energy, which increases their intrinsic rate of rotation or vibration and the likelihood that inner shell electrons will be promoted to outer shells, thereby creating a less stable structure. These events result in an increased frequency of the molecules to attain a transition state. In the presence of catalyst, the transition state is stabilized and therefore the reaction proceeds accordingly.

The above described methods can also be used for improving reaction rates in solid-phase reactions.

EXAMPLE 2

Improved PCR

A method/device is hereby provided to increase the speed and efficiency of PCR. Such method/device may also increase the yield of PCR products and reduce the amount of reactants used by virtue of minimizing or eliminating heating of the PCR reaction solution. Reducing or eliminating the heat involved in denaturation also reduces or eliminates the need for thermostable enzymes.

Strategies described within include activating molecules or molecular groups through energy absorption from infrared radiation. Absorption of infrared radiation by biomolecules can be broken down into three regions. In the near-infrared (NIR, 800 nm–1.5 microns), an OH group stretching vibration is near 7140 cm$^{-1}$ (1.4 microns) and an NH stretching vibration is near 6667 cm$^{-1}$ (1.5 microns). In the mid-infrared, 4000 to 1300 cm$^{-1}$ (2.5–7.7 microns) is the "group frequency region", while 1300 to 650 cm$^{-1}$ (7.7–15.4 microns) is the "fingerprint region". Absorptions depend on the functional group present (in the case of the former) and not the complete molecular structure, or depend on single-bond stretching and bending vibrations (in the case of the latter).

Denaturation of DNA can be achieved using radiative energy [2]. Radiant energy with a wavenumber of about 1550–1800 cm$^{-1}$ induces in-plane double-bond vibrations of bases, with a wavenumber of about 1275–1550 cm$^{-1}$ induces base deformation motions coupled through glycosidic linkages to sugar vibrations, with a wavenumber of about 1050–1275 cm$^{-1}$ induces phosphate and sugar vibrations, and with a wavenumber of about 750–1050 cm$^{-1}$ induces vibrations of the sugar-phosphate backbone and bases. All of these infrared spectral domains are in the infrared region of the electromagnetic spectrum (wavelengths of about 5.5–12.5 microns). It is therefore possible to induce motions in specific bonds with infrared electromagnetic energy. For example, the 1225 cm$^{-1}$ and 1084 cm$^{-1}$ (asymmetric and symmetric stretching vibrations of nucleic acids) bands could be targeted by lasers emitting long-wavelength radiant energy; in the case of the former, a $CO_2$ laser would suffice.

DNA has hydrogen bonds between the two strands. For every adenine and thymine base, there are two hydrogen bonds, viz.: O—H and N—H. For every cytosine and guanine base, there are three hydrogen bonds, viz.: two O—H and one N—H. These hydrogen bonds hold the DNA together in the form of a double helix. If these bonds are broken, the DNA unwinds and denatures into two complimentary strands. The ionic OH and NH bonds have energies on the order of 111 and 93 kcal/mol respectively, while the O—H and N—H hydrogen bonds have energy on the order of about 1 kcal/mol, which is why they are easily broken. One method of breaking hydrogen bonds is by continued exposure to temperatures on the order of 75° C. Similarly, hydrogen bonds can be broken by radiant energy photons with a wavelength of about 32 microns or less. On the other hand, the ionic OH and NH bonds require photons with wavelengths of about 307 nm or less. Consequently, one can break hydrogen bonds in DNA without causing breaks in the DNA strands themselves (i.e. between the base-sugar or base-phosphate bonds) by using radiant energy with a wavelength greater than about 300 nm. However, by using infrared radiant energy, any damage to bonds other than hydrogen bonds (such as weak covalent bonds with energies on the order of 3–7 kcal/mol) can be avoided.

Figure 1:
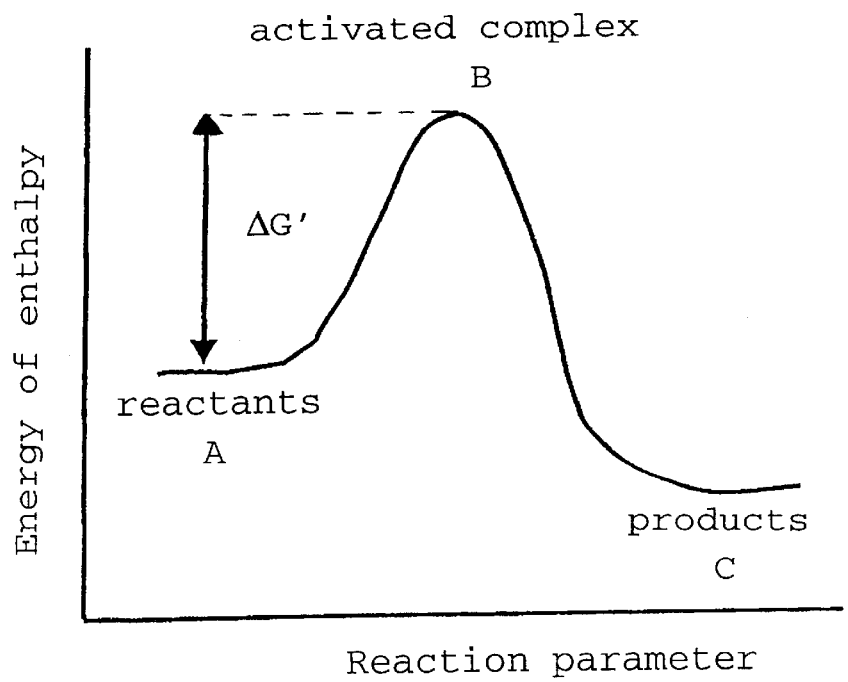
FIG. 1 shows reaction coordinates as a function of the free energy. The free energy of activation, $\Delta G'$, is the energy that must be overcome for the reaction to proceed.
Figure 2:
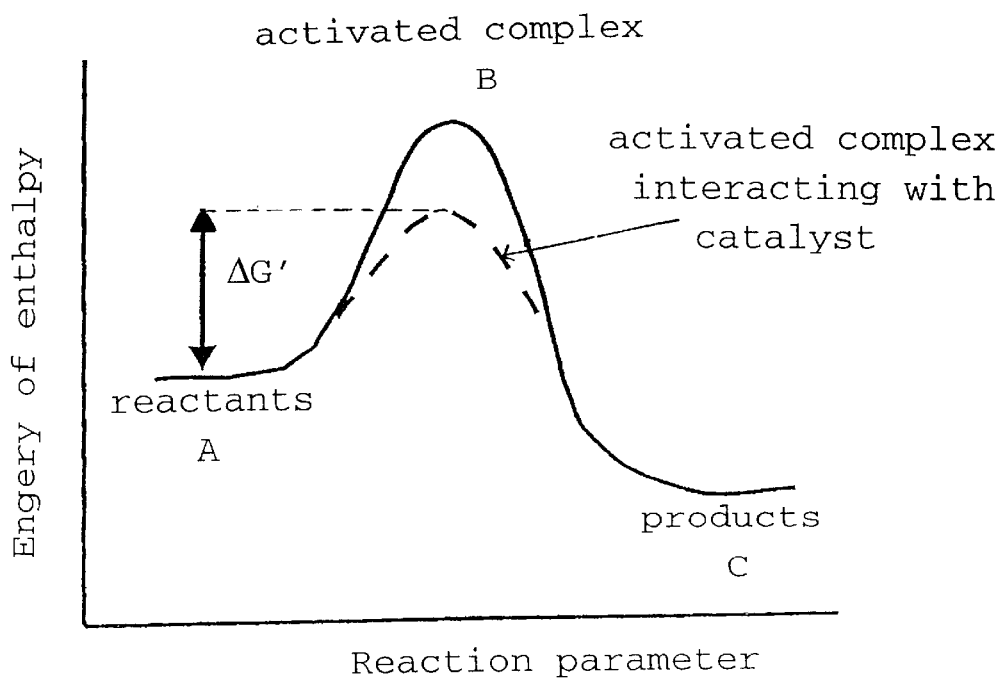
FIG. 2 shows reaction coordinates as a function of the free energy in the presence of a catalyst. The free energy of activation, $\Delta G'$, is much smaller compared to that without the catalyst (see FIG. 1).

Radiative energy can be used to break the hydrogen bonds and also induce specific motions in the DNA molecule. It has been shown [3] that vibrational excitation is efficacious in promoting endoergic reactions. By adding kinetic energy to the molecules, the energy barrier $E_a$ in FIG. 1 can be overcome. For example, the OH stretching vibration near 1.4 microns and the NH stretching vibration near 1.5 microns could be excited with radiant energy produced by, for example, an Nd:YLF or Nd:glass laser. Thus, irradiating the DNA with 1.4–1.5 micron radiant energy prior to the hydrogen-bond-breaking step done with radiant energy at a longer wavelength would increase the reaction rate. Similarly, by irradiating the denatured DNA with 1.4–1.5 micron radiant energy after the denaturation step would increase the reaction rates of the annealing and extension step. In this way, different wavelengths may be used to differentially or combinatorially enhance the conversion of species from one to another.

There are other forms of energy which can be used to enhance reaction rates. Compressional or tensile propagating pressure waves can be produced by irradiating biological media with pressure waves produced by acoustic transducers (such as piezoelectric crystals or ultrasonic transducers) or radiant energy produced by a pulsed laser, or by irradiating absorbing materials placed in intimate acoustic contact with tissue of interest. Shock waves (propagating pressure waves moving in a medium at velocities greater than the speed of sound in the medium) can be created with significant amplitudes (quantified in bars or J/cm$^3$) while propagating pressure waves travelling at the velocity of sound typically are of less amplitude. It can be beneficial to use shock waves in the present invention as they may be more efficient for inducing bond breaks or molecular vibrations and/or rotations. The physical characteristics of propagating pressure waves not only result from the energy source used to create the waves, but also are a consequence of the medium in which they propagate [4]. Thus a propagating pressure wave can transform into a shock wave within a short distance while propagating in water, for example. A pressure wave with an amplitude of 300 bars can provide about 0.72 kcal/mol of energy. This is sufficient to break hydrogen bonds, but not enough to break covalent or ionic bonds. The ability to break bonds and induce vibrations results from not only the amplitude of the wave, but also the temporal characteristics. Further, the addition of an appropriate catalyst to any of these enhanced reactions would favor stabilization of transition molecules and therefore further increase the forward reaction rate.

When propagating pressure waves are produced by pulsed laser radiant energy impinging on an absorbing target (FIG. 4A), different shaped targets may be beneficial (FIGS. 4B–4E). For example, different shaped targets within the walls of the reaction chamber, or inside the reaction solution, can produce pressure waves that can be beneficial. Multiple lasers can also be used to produce multiple propagating pressure waves impinging on the reaction mixture from different directions. It is beneficial to continually mix the reaction mixture and place the reaction chamber on a controllable heating/cooling element to maintain the temperature of the reaction solution in a region suitable for the process to take place.

Alternatively, it can be beneficial to de-gas the reaction mixture, or introduce hyperbaric inert gases (e.g. $N_2$) in the reaction mixture, so as to maintain a sealed reaction vessel in order to modulate the extent to which cavitation bubbles are produced. These bubbles propagate and carry significant amounts of energy to damage biological media, such as DNA. On the other hand, if they are controllably produced, they may be used to beneficially add energy to the reaction mixture.

Finally, pulsed or continuous wave radiant energy can be used to directly excite molecules to which light-absorbing complexes are attached. For example, by attaching indocyanine-green dye to molecular species which can come into contact with, or come in close proximity to, the DNA, primers or nucleotides of interest, energy can be added to the reactants by transference from these dye-conjugates molecules or simply by the dye itself upon the absorption of a pulse of radiant energy from, for example, an alexandrite laser tuned to emit energy with a wavelength of 795 nm. The benefit of such an approach over gross heating of the reaction mixture is that the average power introduced into the reaction mixture is less (in the case of using pulsed irradiation); thus the reaction mixture does not heat up significantly.

EXAMPLE 3

In vivo Catalysis

Catalytic reactions often rely on specific interactions among various reactants or between the catalyst and reactants. The shape and/or size of molecules can sometimes determine where the molecule has an affinity to localize and bind. For example, a particular protein can interact with a particular target molecule when the protein is folded into it's "native" state; when unfolded, or denatured, it typically cannot interact with the target molecule in spite of the fact that the protein still has the same peptide sequence.

The particular desirable (or deleterious) protein-protein, protein-DNA or protein-molecule interaction depends on the correct binding of the molecules. The efficiency of binding or reacting can be increased by increasing the rate at which the molecules "bump" into each other. This is typically a function of concentration and kinetic energy in the system. Alternatively, binding or reacting can be altered by a change in conformation of one or both of the molecules. A conformational change may increase the exposure of the binding sites on each molecule or may alter the shape of each molecule such that they can approach each other more closely. For example, it is generally accepted that blocking the flow of sodium through the sodium channel in nerve cell membranes makes the nerve inexcitable by local action currents. Changes in the shape and caliber of this channel determines what anesthetics are efficacious. The shape and caliber of the channel can be changed by, for example, action potentials, toxins, and local anesthetics that bind to gating receptor sites. Some local anesthetics bind to a channel protein binding site thus rendering the sodium channel blocked.

In all of the aforementioned situations, it might be desirable to increase (or decrease) the probability of two molecules interaction in vivo by use of electromagnetic energy or propagating pressure waves. For example, radiant energy with particular parameters can be used to produce intense propagating pressure waves in tissues, which can serve to transiently alter the shapes of molecules, in turn altering the way molecules interact in those tissues. Alternatively, direct absorption in the molecule of electromagnetic energy (for example, infrared radiation) can cause vibrations and rotations, thereby enhancing the ability of the molecule to approach and/or bind to a particular site. Taken to an extreme, molecules that do not normally interact by virtue of their mutually repulsive conformations can be made more reactive by the addition of energy which alters their conformations.

Transport of molecules across membranes or other tissue barriers may be enhanced through application of the concepts described herein. For example, irradiation of a membrane or the skin will result in transient changes in the molecular configuration of its constituents. Molecules which come into contact with the irradiated molecules will have an accelerated rate of binding or reacting as compared to those in non-irradiated tissue. This concept may be applied to drug permeation through membranes or tissue barriers. For example, one of the rate limiting steps in permeation of compounds through membranes or tissue barriers is the rate of initial binding to local receptors. In the case of locally acting anesthetics, such as lidocaine, permeation is in part related to the rate of local binding to receptors. Under the concepts herein, local anesthetics will bind irradiated membrane receptors at an accelerated rate over non-irradiated receptors. Thus, these anesthetics will permeate the membrane at an accelerated rate, as long as they are able to bind to their receptors at an accelerated rate. This concept thus improves the rate at which drugs can be delivered across tissue and membrane barriers.

EXAMPLE 4

Heat Mediated Reaction Catalysis

In the present study, a reaction involving test molecules is enhanced by transiently and repetitively raising the temperature of the surrounding environment (i.e. the ambient molecules).

PCR reaction: A PCR mixture including buffers, primers, Taq polymerase and deoxyribonucleotides was prepared as per manufacturer's instructions and placed in a reaction vial. Equal amount of a sample of DNA to be amplified was added to the mixture. The reaction mixture was exposed to the radiant energy produced by a Ho:YAG laser. The laser radiant energy output was configured to produce a spot size at the reaction vial of 5 mm, with a 400 microsecond pulse, 10 Hz pulse repetition rate, and 200 mJ/pulse pulse energy. The radiant energy, which was absorbed by the reaction mixtures, was arranged to impinge on the lateral side of the reaction vial in a position so that the reaction mixture was irradiated. The irradiation continued on for a period of 20 minutes, after which the mixture was assayed for DNA amplification. The degree of amplification was compared to non-irradiated (control) samples. It shows that greater amplification occurred in the irradiated mixture as compared to controls.

ELISA: An enzyme linked immunoassay (ELISA) reaction mixture was prepared in 96-well plates previously seeded with equal numbers of rat cancer cells. The reaction mixture was MTT, which produces a colorimetric change in the presence of viable cells. After adding the assay reaction mixture to the wells in the plate, single wells were irradiated with the radiant energy produced by a Ho:YAG laser. The laser radiant energy output, which was absorbed by the reaction mixtures, was configured to produce a spot size at the surface of the reaction mixture of 5 mm, with a 400 microsecond pulse, 10 Hz pulse repetition rate, and 200 mJ/pulse pulse energy. The irradiation continued on for a period of 10 minutes, after which a solvent was added and the mixture was spectroscopically assayed for color. The result shows that a greater degree of color change (in other words, a greater optical density OD) occurred in the irradiated mixture as compared to controls. Since the wells were seeded with equal numbers of cells, the greater OD is indicative of an enhanced reaction catalysis and not of different numbers of viable cells.

Alternatively, an ELISA reaction mixture was prepared in 96-well plates previously seeded with equal numbers of rat cancer cells. The reaction mixture was MTT, which produces a colorimetric change in the presence of viable cells. After adding the assay reaction mixture to the wells in the plate, entire 96-well plate was exposed to microwave energy by placing the plate within a 500 Watt microwave oven. The microwave irradation conditions were as follows: the oven was set to the defrost mode (lowest power possible) and the oven was sequenced on and off repetitively (approximately 2 seconds on and 10 seconds off) for a period of 10 minutes. After the irradiation, a solvent was added and the mixture was spectroscopically assayed for color. The result shows that a greater degree of color change (in other words, a greater optical density OD) occurred in the irradiated mixture as compared to non-irradiated controls. Since the wells were seeded with equal numbers of cells, the greater OD is indicative of an enhanced reaction catalysis and not of different numbers of viable cells.

EXAMPLE 5

Heat Mediated Reaction Catalysis With Added Absorber

In the present study, a reaction involving test molecules is enhanced by transiently and repetitively raising the temperature of an absorbing species added to the surrounding environment (reaction mixture).

A PCR mixture was prepared as per manufacturer's instructions and placed in a reaction vial. Equal amount of a sample of DNA to be amplified was added to the mixture. The enzyme present in the reaction mixture was Taq polymerase. The reaction mixture was exposed to the radiant energy produced by a ruby laser. The laser radiant energy output was configured to produce a spot size at the reaction vial of 5 mm, with a 400 microsecond pulse, 10 Hz pulse repetition rate, and 200 mJ/pulse pulse energy. Indocyanine green (ICG) was solubilized in ultrapure water and added to the reaction mixture to a final concentration of 1%. The radiant energy, which was absorbed primarily by the ICG, was arranged to impinge on the lateral side of the reaction vial in a position so that the reaction mixture was irradiated. The irradiation continued on for a period of 20 minutes, after which the mixture was assayed for DNA amplification. The degree of amplification was compared to non-irradiated (control) samples. The result shows that greater amplification occurred in the irradiated mixture as compared to controls.

EXAMPLE 6

Reaction Catalysis by Self-Absorption

In the present study, a reaction involving test molecules is enhanced by transiently and repetitively adding energy to the test molecules themselves.

A PCR mixture including buffers, primers, Taq polymerase and deoxyribonucleotides was prepared as per manufacturer's instructions and placed in 0.1 mm pathlength optical cuvettes. Equal amount of a sample of DNA to be amplified was added to the mixture. The reaction mixture was exposed to the radiant energy produced by an Nd:YLF laser. The laser radiant energy output was configured to produce a spot size at the lateral side of the cuvette of 5 mm, with a 400 microsecond pulse, 10 Hz pulse repetition rate, and 20 mJ/pulse pulse energy. The radiant energy, which was absorbed by the OH and NH stretching vibrations in DNA at or near 1.4–1.5 microns, was arranged to impinge on of the reaction vial in a position so that the reaction mixture was irradiated. The irradiation continued on for a period of 20 minutes, after which the mixture was assayed for DNA amplification. The degree of amplification was compared to non-irradiated (control) samples. The result shows that greater amplification occurred in the irradiated mixture as compared to controls.

EXAMPLE 7

Reaction Catalysis by Exposure to Propagating Pressure Waves

In the present study, a reaction involving test molecules is enhanced by transiently and repetitively exposing the test molecules and reaction mixture to propagating pressure waves.

A PCR mixture including buffers, primers, Taq, or other DNA polymerase, and deoxyribonucleotides was prepared as per manufacturer's instructions and placed in a reaction cuvette. Equal amount of a sample of DNA to be amplified was added to the mixture. A Q-switched or mode-locked laser (e.g., ruby or Nd:YAG) with a 20 ns pulse duration, 1 mm spot size, 10 Hz pulse repetition rate and 20 mJ pulse energy was directed on a light absorbing material (e.g. thermoelectrically cooled black anodized aluminum) in intimate acoustic contact with the reaction cuvette. In this case, impulse transients up to about 1000 bars can easily be created in the reaction cuvette. By irradiating the reaction cuvette for several seconds during the denaturation step of the PCR cycle, it was not necessary to heat the reaction mixture. Using a lesser intensity of irradiation during the annealing and extension steps also served to increase the reaction rate. Heating and cooling cycles, like in regular thermally controlled PCR, can optionally be done during each stage using a standard PCR reaction apparatus, such as manufactured by Perkin Elmer Inc.

EXAMPLE 8

Reaction Catalysis by Exposure to Cavitation

In the present study, a reaction involving test molecules is enhanced by transiently and repetitively exposing the test molecules and reaction mixture to cavitation.

An ultrasonic tissue disrupter, with 5 mm diameter probe tip, was immersed in the MTT-ELISA reaction mixture. In order to minimize heating and yet produce cavitation, the ultrasound was applied with a duty cycle of approximately 2 seconds on and 10 seconds off, and the reaction tube was kept in a thermoelectrically cooled plate. After the irradiation, a solvent was added and the mixture was spectroscopically assayed for color. The result shows that a greater degree of color change (in other words, a greater optical density OD) occurred in the irradiated mixture as compared to non-irradiated controls, which is indicative of an enhanced reaction catalysis and not of different numbers of viable cells.

The following references were cited herein.

[1] R. Zare, *Laser Control of Chemical Reactions*. Science 279, pp. 1875–1879, 1998.

[2] J. Liquier and E. Taillandier. *Infrared Spectroscopy of Nucleic Acids*. In. *Infrared Spectroscopy of Biomolecules*. H. Mantsch and D. Chapman, eds., pp 131–158, Wiley-Liss: N.Y., 1996.

[3] Polanyi J C. Acc. Chem. Res. Vol. 5, page 161, 1972.

[4] Esenaliev, R. O. et al. *Studies of Acoustical and Shock Waves In the Pulsed Laser Ablation of Biotissues*. Lasers Surg. Med. 13, pp. 470–484, 1993.

Any patents or publications mentioned in this specification are indicative of the levels of those skilled in the art to which the invention pertains. These patents and publications are herein incorporated by reference to the same extent as if each individual publication was specifically and individually indicated to be incorporated by reference.

One skilled in the art will readily appreciate that the present invention is well adapted to carry out the objects and obtain the ends and advantages mentioned, as well as those inherent therein. The present examples along with the methods, procedures, treatments, molecules, and specific compounds described herein are presently representative of preferred embodiments, are exemplary, and are not intended as limitations on the scope of the invention. Changes therein and other uses will occur to those skilled in the art which are encompassed within the spirit of the invention as defined by the scope of the claims.

What is claimed is:

1. A method of accelerating a biochemical reaction, comprising the steps of:

placing reactant(s) in a liquid medium for said biochemical reaction into a reaction vessel;

applying radiofrequency energy directly to said reactant(s), wherein a molecular state of said reactant(s) is changed said molecular state comprising temperature of said reactant(s) molecular vibration, molecular rotation, or a combination thereof and wherein frequency of said reactant(s) reaching a transition state of reaction to form at least one product is increased; and forming said product(s) at the increased frequency of transition of said reactant(s) thereby accelerating the biochemical reaction.

2. The method of claim 1, further comprising:

providing an enzymatic catalyst in said liquid medium; and stabilizing said reactant(s) in said transition state.

* * * * *